(12) United States Patent
Sarkinen et al.

(10) Patent No.: US 7,151,744 B2
(45) Date of Patent: Dec. 19, 2006

(54) MULTI-SERVICE QUEUING METHOD AND APPARATUS THAT PROVIDES EXHAUSTIVE ARBITRATION, LOAD BALANCING, AND SUPPORT FOR RAPID PORT FAILOVER

(75) Inventors: Scott A. Sarkinen, Mounds View, MN (US); Scott A. Davidson, Savage, MN (US)

(73) Assignee: SLT Logic LLC, Boston, MA (US)

( * ) Notice: Subject to any disclaimer, the term of this patent is extended or adjusted under 35 U.S.C. 154(b) by 1136 days.

(21) Appl. No.: 09/957,751

(22) Filed: Sep. 21, 2001

(65) Prior Publication Data

US 2003/0058880 A1    Mar. 27, 2003

(51) Int. Cl.
*G01R 31/08* (2006.01)

(52) U.S. Cl. ................................ 370/230; 370/413

(58) Field of Classification Search ................ 370/230, 370/230.1, 232, 234, 235, 237, 242, 244, 370/252, 412, 413; 709/213, 223, 238
See application file for complete search history.

(56) References Cited

U.S. PATENT DOCUMENTS

| | | | |
|---|---|---|---|
| 5,231,633 A | 7/1993 | Hluchyj et al. | |
| 5,231,663 A | 7/1993 | Earl et al. | |
| 5,260,935 A | 11/1993 | Turner | |
| 5,268,900 A | 12/1993 | Hluchyj et al. | |
| 5,455,825 A | 10/1995 | Lauer et al. | |
| 5,570,360 A | 10/1996 | Klausmeier et al. | |
| 5,579,312 A | 11/1996 | Regache | |
| 5,629,936 A | 5/1997 | Lee et al. | |
| 5,689,500 A * | 11/1997 | Chiussi et al. | 370/235 |
| 5,781,531 A | 7/1998 | Charny | |
| 5,864,540 A | 1/1999 | Bonomi et al. | |
| 5,870,396 A | 2/1999 | Abu-Amara et al. | |
| 5,870,629 A | 2/1999 | Borden et al. | |
| 5,923,656 A | 7/1999 | Duan et al. | |
| 6,018,527 A | 1/2000 | Yin et al. | |
| 6,021,116 A | 2/2000 | Chiussi et al. | |
| 6,052,375 A | 4/2000 | Bass et al. | |

(Continued)

OTHER PUBLICATIONS

"Asynchronous Transfer Mode (ATM)," http://iwander.vlsi.uiuc.edu/abr/atmintro.html, printed Apr. 26, 2001, pp. 1-5.

(Continued)

*Primary Examiner*—Ajit Patel
*Assistant Examiner*—Chirag Shah
(74) *Attorney, Agent, or Firm*—Patterson, Thuente, Skaar & Christensen, P.A.

(57) ABSTRACT

The present invention provides a multi-service queuing method and apparatus that provides exhaustive arbitration, load balancing, and support for rapid port failover. Routers and switches according to the present invention can instantaneously direct the flow of traffic to another port should there be a failure on a link, efficiently handle multicast traffic and provide multiple service classes. The fabric interface interfaces the switch fabric with the ingress and egress functions provided at a network node and provides virtual input and output queuing with backpressure feedback, redundancy for high availability applications, and packet segmentation and reassembly into variable length cells. The user configures fixed and variable-length cells. Virtual input and output queues are coupled to a switch fabric. Statistics regarding the virtual input and output queues are collected and packet queuing for the virtual input and output queues is controlled using the collected statistic to provide congestion control for the virtual input and output queues and the switch fabric.

21 Claims, 10 Drawing Sheets

U.S. PATENT DOCUMENTS

| | | | |
|---|---|---|---|
| 6,067,298 | A | 5/2000 | Shinohara |
| 6,072,800 | A | 6/2000 | Lee |
| 6,108,305 | A | 8/2000 | Charny et al. |
| 6,118,761 | A * | 9/2000 | Kalkunte et al. ............ 370/229 |
| 6,130,878 | A | 10/2000 | Charny |
| 6,141,355 | A | 10/2000 | Palmer et al. |
| 6,192,406 | B1 | 2/2001 | Ma et al. |
| 6,320,864 | B1 * | 11/2001 | Hebb et al. ................. 370/412 |
| 6,721,271 | B1 * | 4/2004 | Beshai et al. ............... 370/232 |
| 2001/0004362 | A1 | 6/2001 | Kamiya |
| 2001/0033552 | A1 * | 10/2001 | Barrack et al. ............. 370/282 |
| 2002/0080780 | A1 * | 6/2002 | McCormick et al. ....... 370/355 |
| 2002/0141427 | A1 * | 10/2002 | McAlpine .................. 370/413 |
| 2003/0021230 | A1 * | 1/2003 | Kuo et al. .................. 370/230 |

OTHER PUBLICATIONS

"Introduction to ABR," http://iwander.vlsi.uiuc.edu/abr/abrintro.html, printed Apr. 26, 2001, pp. 1-4.

"The Virtual Output Queue," http://iwander.vlsi.uiuc.edu/abr/virtqueue.html, printed Apr. 26, 2001, pp. 1-7.

"Simulation Results," http://iwander.vlsi.uiuc.edu/abr/simulation_results.html, printed Apr. 26, 2001, pp. 1-4.

"ABR Architecture And Simulation For an Input-Buffered And Per-VC Queued ATM Switch,"Bossardt et al., Dept. of Electrical and Computer Engineering, Univ. of IL, Feb. 1998.

"Reinventing The Switch Fabric Architecture," Communication System Design, http://www.csdmag.com/story/OEG20010521S0113, Jun. 1, 2001.

William Wong, "Network Processors Take The High Road . . . And The Low Road," Electronic Design, Jul. 10, 2000, http://www.planetee.com/planetee/servlet/Display/Document?ArticleID=6798, Retrieved Jun. 15, 2001, 3 pgs.

"Network Processors Take The High Road . . . And The Low Road," Electronic Design, Jul. 10, 2000, http://www.planetee.com/planetee/servlet/DisplayDocument?ArticleID=6799, Retrieved Jun. 15, 2001, 2 pgs.

"Network Processors Take The High Road . . . And The Low Road," Electronic Design—Jul. 10, 2000, http://www.planetee.com/planetee/servlet/DisplayDocument?ArticleID=6800, Retrieved Mar. 7, 2002, 3 pgs.

"Network Processors Take The High Road . . . And The Low Road," Electronic Design, Jul. 10, 2000, http://www.planetee.com/planetee/servlet/DisplayDocument?ArticleID=6802, Retrieved Jun. 15, 2001, 1 pg.

"Network Processors Take The High Road . . . And The Low Road," Electronic Design, Jul. 10, 2000, http://www.planetee.com/planetee/servlet/DisplayDocument?ArticleID=6804, Retrieved Jun. 15, 2001, 1 pg.

"Network Processors Take The High Road . . . And The Low Road," Electronic Design, Jul. 10, 2000, http://www.planetee.com/planetee/servlet/DisplayDocument?ArticleID=6806, Retrieved Jun. 15, 2001, 1 pg.

"Network Processors Take The High Road . . . And The Low Road," Electronic Design, Jul. 10, 2000, http://www.planetee.com/planetee/servlet/DisplayDocument?ArticleID=6808, Retrieved Jun. 15, 2001, 1 pg.

"C-5™ Digital Communications Processor," C-PORT, A Motorola Company, Product Brief, Date Unknown, 8 pgs.

"Products," Applications, C-PORT, A Motorola Company, http://www.cportcorp.com/products/applications.htm, Retrieved Jan. 23, 2001, 3 pgs.

David Husak, "Network Processors: A Definition and Comparison," C-PORT, A Motorola Company, May 3, 2000, 8 pgs.

Husak et al., "Network Processor Programming Models: The Key to Achieving Faster Time-to-Market and Extending Product Life," C-PORT, A Motorola Company, May 4, 2000, 8 pgs.

* cited by examiner

MULTI-SERVICE QUEUING METHOD AND APPARATUS THAT PROVIDES EXHAUSTIVE ARBITRATION, LOAD BALANCING, AND SUPPORT FOR RAPID PORT FAILOVER

CROSS-REFERENCE TO OTHER PATENT APPLICATIONS

The following co-pending patent application of common assignee contains some common disclosure: PROGRAMMABLE MULTI-SERVICE QUEUE SCHEDULER, application Ser. No. 09/957,750, filed Sep. 21, 2001, which is incorporated herein by reference in its entirety.

FIELD OF THE INVENTION

This invention relates in general to communication networks, and, more particularly, to a multi-service queuing method and apparatus that provides exhaustive arbitration, load balancing, and support for rapid port failover.

BACKGROUND OF THE INVENTION

Broadband connectivity products provide the physical contact points needed to connect different communications network elements and gain access to communications system circuits for the purposes of installing, testing, monitoring, accessing, managing, reconfiguring, splitting and multiplexing such circuits within service providers' serving offices and the last mile/kilometer portion of communications networks. These products include broadband connection and access devices for copper, coaxial cable, optical, wireless and broadcast communications networks.

The enhancement of broadband connectivity is a perpetual goal of the communications industry. As raw speeds of large-scale and personal computing devices soar, the tremendous increase in data transmission demands continue to push the networking bandwidth envelope to capacity. Technological advances, together with the ever-increasing demand for communicating bandwidth-intensive multimedia content, continually fuel the unrelenting bandwidth dilemma. As the demand for bandwidth escalates, the need for high-bandwidth broadband systems commensurately increases.

The term "broadband" has often been used to describe high-bandwidth transmission of data signals, such as data, video, voice, video conferencing, etc. Broadband philosophies often address networking principles applicable to the backbone of the networking system, since the networking backbone generally faces the highest bandwidth demands. There are many competing technologies for delivering broadband access. For example, there are a number of standards used in digital telecommunications, including TCP/IP (Transmission Control Protocol/Internet Protocol), Ethernet, HDLC (High-level Data Link Control), ISDN (Integrated Services Digital Network), ATM (Asynchronous Transfer Mode), X.25, Frame Relay, Digital Data Service, FDDI (Fiber Distributed Data Interface), T1, xDSL (x Digital Subscriber Line), Wireless, Cable Modems, and Satellite among others.

Many of these standards employ different packet and/or frame formats. The term "frame" is often used in reference to encapsulated data at OSI layer 2, including a destination address, control bits for flow control, the data or payload, and CRC (cyclic redundancy check) data for error checking. The term "packet" is often used in reference to encapsulated data at OSI layer 3. Further, the term "cell" is often used in reference to a group of bytes/octets conditioned for transmission across a network. However, it should be understood that for purposes of the present application, the terms packet, frame, and cell may be used interchangeably to refer to groups or collections of data. Further, a packet format or frame format generally refers to how data is encapsulated with various fields and headers for transmission across the network. For example, a data packet typically includes a destination address field, a length field, an error correcting code (ECC) field or cyclic redundancy check (CRC) field, as well as headers and trailers to identify the beginning and end of the packet. The terms "packet format" and "frame format" also referred to as "cell format" are generally synonymous for purposes of this application.

Packets transmitted across a network are associated with a transmission protocol. A protocol is a set of rules that governs how devices on a network exchange information. Packets traversing the network may be of differing formats or protocols. Examples of typical protocols used to communicate information include the Internet Protocol (IP), which is a "best-effort," connectionless protocol responsible for delivering data from host to host across a network such as the Internet. IP is a predominant protocol used to transmit data across the Internet.

Other protocols are used to transmit packets across the Internet as well, such as Framed ATM over SONET/SDH Transport (FAST) and IP on multiprotocol label switching (MPLS). FAST is a new protocol intended to improve the performance of asynchronous transfer mode (ATM). FAST introduces a variable length user data field, while preserving the proven advantages of ATM, such as real quality of service guarantees, the security and traffic isolation provided by virtual connections, network management, traffic management, control mechanisms for bandwidth on demand, etc. MPLS integrates layer-2 information about network links into layer-3 (IP) within a particular autonomous system in order to simplify and improve IP-packet exchange. MPLS essentially provides connection-oriented labeling in an otherwise connectionless environment. With MPLS, different flows can be classified, and different service levels can be associated with the different flow classifications.

As described above, packets transmitted on a network such as the Internet may be associated with one of a number of different protocols, and thus packets associated with different protocols may be received at a given node, switch, router, etc. The introduction of multiple packet protocols at a node may require special consideration when the entire data flow is subject to editing as the packets traverse the network. For example, fairness with variable sized packets, redundancy and failover mechanisms for high availability applications must be supported.

Redundancy has often been solved by using SONET rings for telecommunications networks, and routing protocols and hot standby routers for routers in Internet networks. SONET rings include rings of fiber so that if the fiber is cut at any one location the data can travel the other direction on the ring. SONET rings have been used for traditional telecom applications, but do not lend themselves well to data oriented networks as most of the data implementations are a meshed configuration of routers not a series of add drop multiplexers on a SONET ring.

Providing fast recovery for routers or switches in a meshed configuration is required for the data networks to achieve the same reliability of the traditional telecom networks. This problem has been solved in the past by relying on the routing protocols to detect a failed link and recover and/or to have a hot standby router to switch over to should the link or the router fail. However, reliance on the routing protocols does not provide fast enough recovery and hot standby routers are a costly solution because duplicate routers are required in the system. Accordingly, there is a need for routers and switches to be able to instantaneously direct the flow of traffic to another port should there be a failure on a link.

The convergence of the telecommunications and data networks has put the burden on systems to also provide multiple service classes to differentiate the traffic that is on the network. Traditionally the telecommunications networks have been a statistical multiplexing hierarchy that provided connection oriented circuits for guaranteed bandwidth. The data networks have traditionally used best effort services providing all packets the same service in a connectionless best effort manner. As the transport speeds keep increasing there is an expansion in the types of traffic on each transport link. Therefore, the devices that are terminating high-speed transport links need the ability to separate and classify each of the service classes and process them according to the service guarantees.

There are a number of emerging protocols to address the problem of providing differentiated service such as MPLS, RSVP and Diff-Serv. To implement these protocols the entire end-to-end system must be aware of different service levels and to provide them in the form of bandwidth, latency and jitter parameters.

The merging of best effort traffic and statistical multiplexed traffic is required by the system vendors to effectively implement the emerging protocols. This problem is greatly aggravated by variable length packets, burstiness of the Internet coupled with the demands of voice and video traffic. The mixing of short and long packets increases the difficulty in providing jitter and latency guarantees. Accordingly, there is a need for a solution to provide multiple service classes through a router or switch interconnecting high-speed transport links.

Multicast is another important technology for distributing broadband services through data networks. The ability of switches and routers to multicast a packet greatly reduces the amount of traffic distributed on upstream networks.

There are many issues in deploying large multicast networks. The throughput of today's routers for multicast is severely limited. Multicast by its nature is a difficult problem and requires efficient hardware to enable effective multicast solutions. Actual multicast throughput may only be 5% to 10% of capacity due to inefficient support for multicast. The Internet Engineering Task Force (IETF) has dedicated experimental networks for multicast applications.

There are two basic mechanisms from replicating a multicast packet. The first is to put the packet into memory and then retrieve it multiple times. The second method is to use multiplexers to duplicate the packet in real time, such as in a crossbar switch. The first solution reduces the amount of memory bandwidth by the number of times it is to be replicated thereby making it costly for large multicast applications. The second approach does not reduce the throughput as the packets are duplicated in real time. However the burden is on the system to ensure that there is no contention for the destinations before the replication occurs. The arbitration for the available destination and waiting for 1 of the destinations to free can and will significantly reduce throughput for multicast traffic. Thus, there is a need for a system that efficiently handles multicast traffic.

It can be seen then that there is a need for a multi-service queuing method and apparatus that provides exhaustive arbitration, load balancing, support for rapid port failover and efficient multicast.

SUMMARY OF THE INVENTION

To overcome the limitations in the prior art described above, and to overcome other limitations that will become apparent upon reading and understanding the present specification, the present invention discloses a multi-service queuing method and apparatus that provides exhaustive arbitration, load balancing, support for rapid port failover and efficient multicast.

The present invention solves the above-described problems by providing a multi-service switch that provides virtual input and output queuing with backpressure feedback, redundancy for high availability applications, and packet segmentation and reassembly into variable length cells. Thus, routers and switches according to the present invention can instantaneously direct the flow of traffic to another port should there be a failure on a link, efficiently handle multicast traffic and provide multiple service classes.

A method in accordance with the principles of the present invention includes providing virtual input and output queues coupled to a switch fabric comprising switch elements, collecting statistics regarding the virtual input and output queues and controlling packet queuing for the virtual input and output queues using the collected statistic to provide congestion control for the virtual input and output queues and the switch fabric.

Other embodiments of a method in accordance with the principles of the invention may include alternative or optional additional aspects. One such aspect of the present invention is that the controlling packet queuing for the virtual input and output queues further comprises providing load balancing by monitoring a state for the virtual input and output queues and directing traffic to an appropriate port on a switch element of the switch fabric.

Another aspect of the present invention is that the controlling packet queuing for the virtual input and output queues further comprises applying a multilevel backpressure indication that is fed back to the virtual input and output queues to prevent violation of a threshold condition caused by storage of a new packet by the virtual input queues.

Another aspect of the present invention is that the multilevel backpressure indication may be selected to reduce an instantaneous rate for a virtual output queue associated with the packet causing congestion or to reduce an average transmission rate of a virtual output queue associated with the packet causing congestion.

Another aspect of the present invention is that the applying multilevel backpressure further comprises dynamically allocating buffers in the virtual output queues to ensure fairness under congestion control.

Another aspect of the present invention is that the buffers are dynamically allocated using per queue thresholds.

Another aspect of the present invention is that the controlling packet queuing for the virtual input and output queues further comprises providing efficient multicast data transfer.

Another aspect of the present invention is that efficient multicast data transfer is provided by combining a memory approach for logical multicast and a switch approach for spatial multicast.

Another aspect of the present invention is that the virtual input and output queues and switch fabric support multi-service classes.

Another aspect of the present invention is that the multi-service classes comprise variable length packets.

Another aspect of the present invention is that the multi-service classes comprise variable quality of service requirements.

Another aspect of the present invention is that the multi-service classes comprise a plurality of rate classes.

Another aspect of the present invention is that the controlling packet queuing for the virtual input and output queues provides rapid failover through reassignment of packets to the virtual input and output queues.

Another aspect of the present invention is that the controlling packet queuing for the virtual input and output queues further comprises instructing a virtual output queue to drop a packet routed to a virtual input queue experiencing congestion based upon the collected statistics.

Another aspect of the present invention is that the dropping of the packet at the virtual output queue saves resources in the switch fabric.

Another aspect of the present invention is that the controlling packet queuing further comprises instructing a virtual output queue to reroute a packet routed to a virtual input queue experiencing congestion based upon the collected statistics.

Another aspect of the present invention is that the controlling packet queuing for the virtual input and output queues further comprises mapping packets to the virtual input and output queues.

Another aspect of the present invention is that the mapping includes mapping different queues for different service classes.

Another aspect of the present invention is that the mapping allows rapid failover for a queue that fails to meet a selected failover criterion.

Another aspect of the present invention is that the collecting statistics further comprises maintaining a state for all virtual input and output queues.

Another aspect of the present invention is that the maintaining a state for all virtual input and output queues further comprises maintaining a state of buffers having worst load violations.

In another embodiment of the present invention, a switch is provided. The switch includes virtual input and output queues for storing packets, a switch fabric, coupled to the virtual input and output queues, the switch fabric including switch elements for receiving packets from a virtual output queue and routing the packet to a virtual input queue, a statistics interface for collecting statistics regarding the virtual input and output queues and a fabric interface controlling packet queuing for the virtual input and output queues, the fabric interface providing congestion control for the virtual input and output queues and the switch fabric.

Another aspect of the switch of the present invention is that the switch further includes a load balancer for monitoring a state for the virtual input and output queues and directing traffic to an appropriate port on a switch element of the switch fabric to balance loading across the switch fabric.

Another aspect of the switch of the present invention is that the fabric interface controls the packet queuing for the virtual input and output queues by applying a multilevel backpressure indication that is fed back to the virtual input and output queues to balance loads based upon the collected statistics.

Another aspect of the switch of the present invention is that the multilevel backpressure indication may be selected to reduce an instantaneous rate for a virtual output queue associated with the packet causing congestion or to reduce an average transmission rate of a virtual output queue associated with the packet causing congestion.

Another aspect of the switch of the present invention is that the fabric interface applies multilevel backpressure by dynamically allocating buffers in the virtual output queues to ensure fairness under congestion control.

Another aspect of the switch of the present invention is that the buffers are dynamically allocated using per queue thresholds.

Another aspect of the switch of the present invention is that the fabric interface provides efficient multicast data transfer.

Another aspect of the switch of the present invention is that efficient multicast data transfer is provided by combining a memory approach for logical multicast and a switch approach for spatial multicast.

Another aspect of the switch of the present invention is that the virtual input and output queues and switch fabric support multi-service classes.

Another aspect of the switch of the present invention is that the multi-service classes comprise variable length packets.

Another aspect of the switch of the present invention is that the multi-service classes comprise variable quality of service requirements.

Another aspect of the switch of the present invention is that the multi-service classes comprise a plurality of rate classes.

Another aspect of the switch of the present invention is that the switch further includes a programmable mapping table, the mapping table programmed to map each of the virtual input and output queues according to traffic characteristics governing packet flows. The mapping table provides rapid failover through reassignment of packets to the virtual input and output queues.

Another aspect of the switch of the present invention is that the mapping table maps different queues for different service classes.

Another aspect of the switch of the present invention is that the mapping table enables rapid failover for a queue that fails to meet a selected failover criterion.

Another aspect of the switch of the present invention is that the fabric interface comprises a backpressure flow controller, the backpressure flow controller providing a multilevel backpressure indicator for instructing a virtual output queue to drop a packet routed to a virtual input queue experiencing congestion based upon the collected statistics.

Another aspect of the switch of the present invention is that the dropping of the packet at the virtual output queue saves resources in the switch fabric.

Another aspect of the switch of the present invention is that the fabric interface further includes a backpressure flow controller, the backpressure flow controller providing a multilevel backpressure indicator for instructing a virtual output queue to reroute a packet routed to a virtual input queue experiencing congestion based upon the collected statistics.

Another aspect of the switch of the present invention is that the statistics interface maintains a state for all virtual input and output queues.

Another aspect of the switch of the present invention is that the statistics interface maintaining a state of buffers having worst load violations.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

Referring now to the drawings in which like reference numbers represent corresponding parts throughout.

DETAILED DESCRIPTION OF VARIOUS EMBODIMENTS

In the following description of the exemplary embodiment, reference is made to the accompanying drawings that form a part hereof, and in which is shown by way of illustration the specific embodiment in which the invention may be practiced. It is to be understood that other embodiments may be utilized as structural changes may be made without departing from the scope of the present invention.

The present invention provides a multi-service queuing method and apparatus that provides exhaustive arbitration, load balancing, support for rapid port failover, and efficient multicast. The fabric interface interfaces the switch fabric with the ingress and egress functions provided at a network node and provides virtual input and output queuing with backpressure feedback, redundancy for high availability applications, and packet segmentation and reassembly into variable length cells. The user configures fixed and variable-length cells. Thus, routers and switches according to the present invention can instantaneously direct the flow of traffic to another port should there be a failure on a link, efficiently handle multicast traffic and provide multiple service classes.

Data transmitted over networks such as the Internet may be in the form of email messages, file transfers and downloads, web page loading, and the like. The data is generally broken up into a number of data packets, frames, or cells, each of which is assigned a hierarchy of headers to direct the data packet to the desired destination, among other things. Each packet is separately dispatched to the destination, although more than one different route may be taken by the various packets associated with the data.

Figure 1:
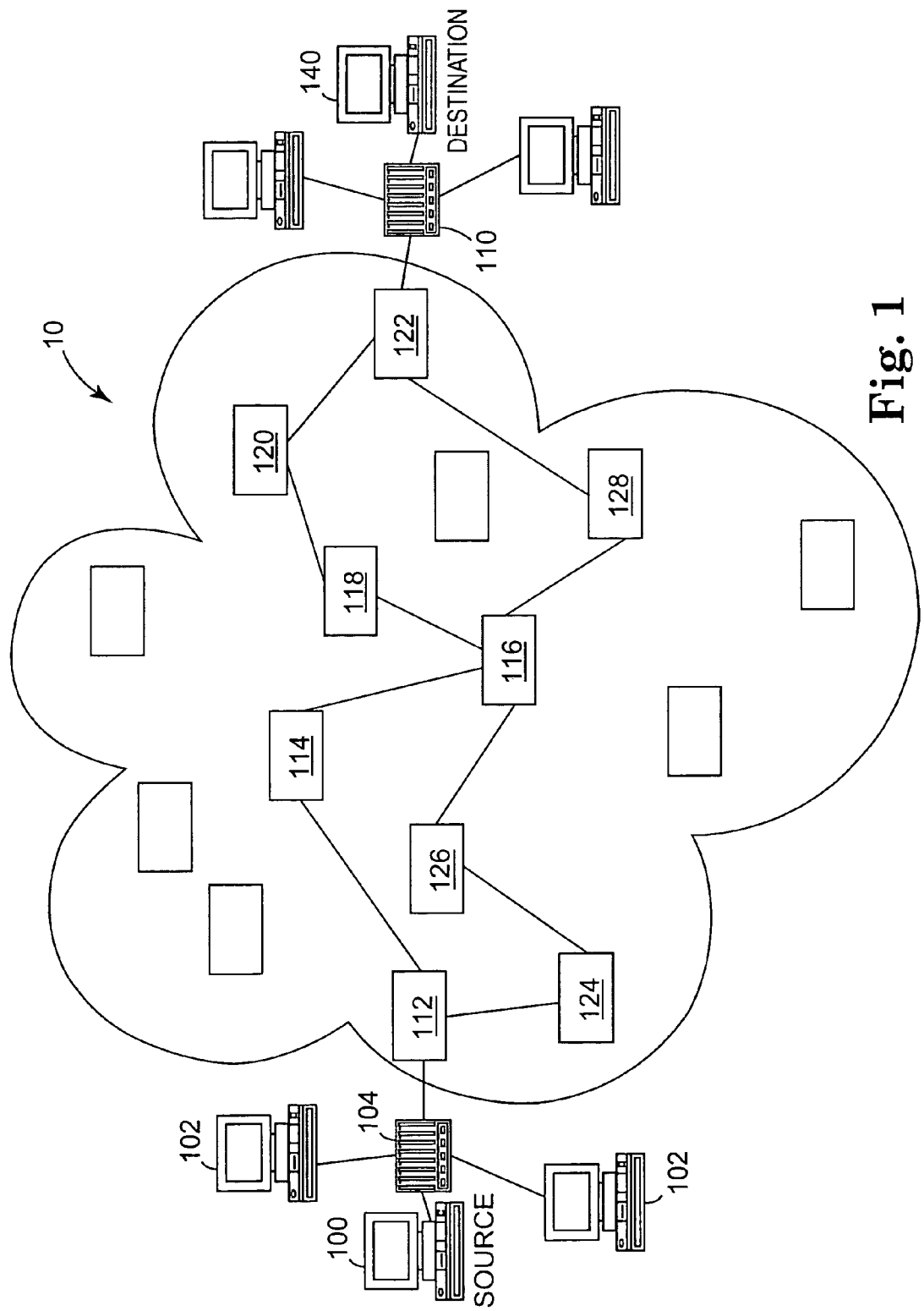
FIG. 1 is a block diagram illustrating a networking environment in which the principles of the present invention may be applied.

For example, the source computer 100 of FIG. 1 may be configured in a local area network (LAN) and coupled to other computers 102 via a hub 104. A first one or more data packets may reach the hub 110 of the destination LAN via a first path, through routers 112, 114, 116, 118, 120, and 122. A second one or more data packets may reach the hub 110 via a second path, such as through routers 112, 124, 126, 116, 128, and 122. These different packets may take alternative routes due to equipment congestion or failure of a node, or to load share where possible. The routers associated with the core of the Internet can reconfigure the paths that these packets follow. This is due to the router's ability to analyze the header information corresponding to the data packet and to communicate line condition and other information between routers. The routers handling data at the major traffic points on large networks, such as the Internet, are generally large stand-alone systems. After transmitting the data from node to node through the network, the packets are reassembled at the receiving end and availed to the desired destination system 140.

Because of the colossal bandwidth demands required of routers, a continual emphasis is placed on alleviating data throughput bottlenecks at routers, gateways, bridges, and other intermediate nodes along the network. Because routers take on the task of intercepting, analyzing, and moving on millions of packets per second along the best possible route, the processing occurring at these routers must be extremely efficient to avoid congesting the system. The present invention may be used in connection with such routing systems, increasing speed and efficiencies of network data throughput.

As will be described more fully below, the present invention may be used to interface ingress and egress processing engines with switch fabric architectures. In one embodiment of the invention, a fabric processor in accordance with the present invention is housed in a package or chip that is coupled to the ingress and egress processor on a line card, and is coupled to a switch fabric through, for example, a backplane. This arrangement, however, is not required, as the fabric interface of the present invention can be coupled to the relevant modules in any desired manner. The fabric interface of the present invention enables advanced services to be applied at speeds up to 10 Gb/s, 40 Gb/s, and more.

Figure 2:
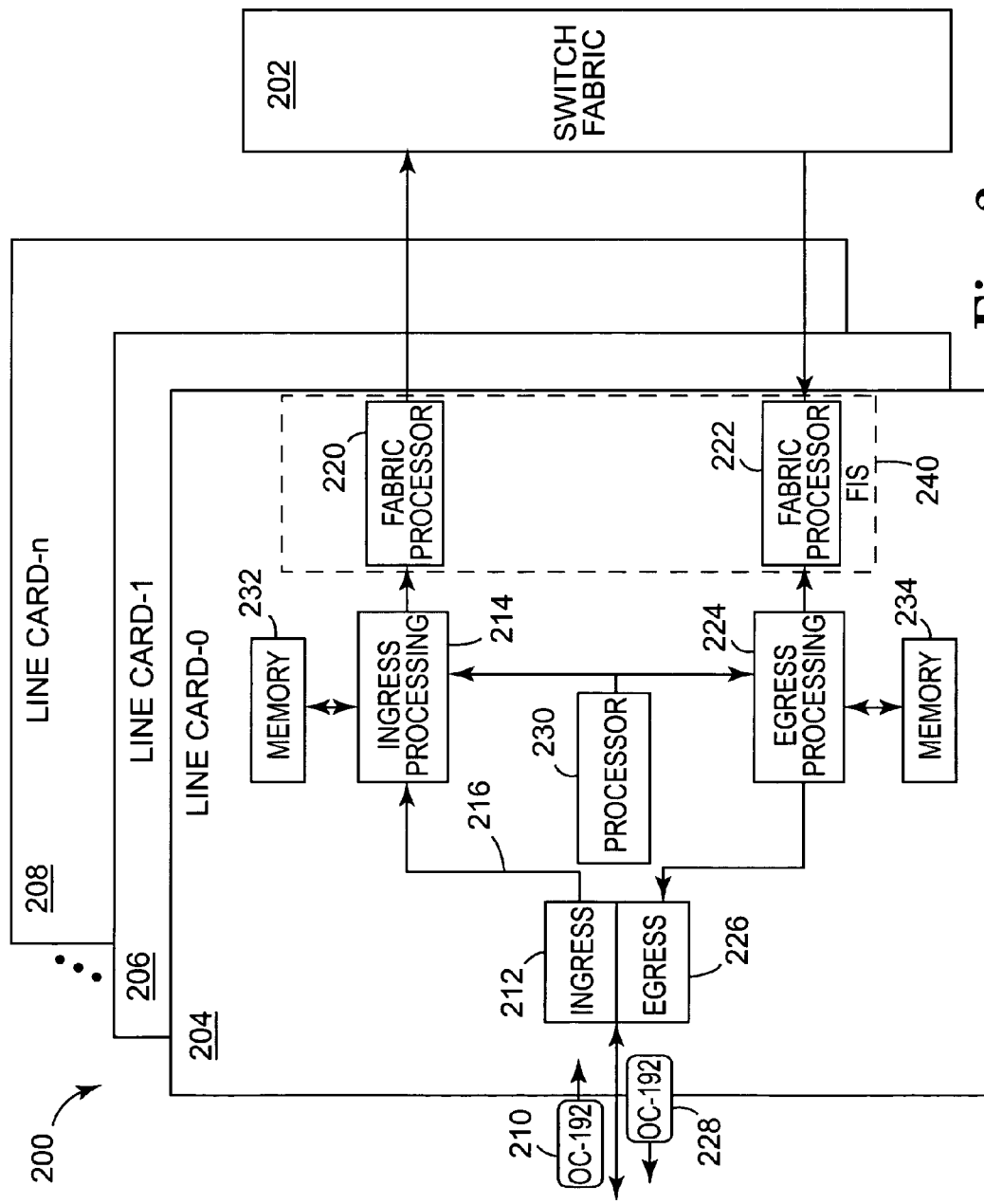
FIG. 2 is a block diagram of an embodiment of a router system in which the present invention may be implemented.

FIG. 2 illustrates one view of a router system 200 in which the present invention may be applied. The present invention may be implemented on a line card, such as 204, 206, 208. However, this configuration is presented merely as one example and other configurations and implementations are possible. In FIG. 2, one or more line cards are shown, each of which are coupled to a switch matrix or switch fabric 202. Generally, a switch fabric provides a manner of transmitting data packets between any one of a plurality of inputs to any one of a plurality of outputs using a matrix of switch elements. The data packets are routed to the appropriate switch fabric output port based on destination information carried within header information of the packet. Switch fabrics may be single-stage or multi-stage. Because large-scale switching needs may require thousands of input and output ports, multi-stage implementations are generally used for high volume switching needs. These multi-stage switch fabrics include switch elements arranged in multiple stages, compared to single-stage switch designs that connect input and output ports in a single stage. A multi-stage switch fabric is also commonly referred to as Multistage Interconnection Network (MIN). The particular structure of a switch fabric may also be dependent on whether a connection-oriented or connectionless technique is to be employed. Thus, a number of different types and configurations of switch fabrics are known in the art.

In the present example, a plurality of line cards are shown, including line card-0 204, line card-1 206 through a finite number of line cards represented by line card-n 208. In one embodiment of the invention, each of the line cards utilizes analogous circuitry. Line card-0 204 will therefore be described, with the understanding that one or more of the remaining line cards in the router system may implement analogous circuitry.

The line card-0 204 in accordance with an exemplary embodiment receives as input, for example, packet-over-SONET/SDH (POS) frames via the network. As is known in the art, SONET/SDH is a high-speed time division multiplexing (TDM) physical-layer transport technology. POS provides a means for using the speed and management capabilities of SONET/SDH to optimize data transport, although originally optimized for voice. Packet Over SONET/SDH (POS) allows core routers to send native IP packets directly over SONET/SDH frames. POS provides a relatively low packet overhead and cost per Mb than other data transport methods, which allows POS to efficiently support increases in IP traffic over existing and new fiber networks. However, the present invention is not meant to be limited to POS frames.

As shown in the exemplary embodiment of FIG. 2, incoming POS OC-192 frames 210 originate from another OC-192 device (not shown) and arrive at the line card-0 204 at the ingress framer 212. The frames are transferred to the ingress processing circuit 214 via an interface 216, such as the Optical Internetworking Forum (OIF) System Packet Interface-4 (SPI-4). OIF SPI-4 describes a data path interface between the physical and link layers to support physical line data rates up to 10 Gb/s, and may be used in connection with the present invention, as may other interfaces of appropriate speed.

Ingress processing circuit 214 performs the necessary lookups, policing, and editing of the packet. If necessary, the frame can be redirected to the host processor 230. The frames are fed out of the ingress processing circuit 214 to a fabric interface shown in FIG. 2 as a fabric processor circuit 220, which is the subject of the present invention.

Generally, the fabric processor 220 converts the data stream from one format to another, such as from POS frames to Common Switch Interface (CSIX) cells, and distributes the cells over the switch fabric 202. Similarly, cells switched at the switch fabric 202 may be received at the fabric processor 222 and provided to the egress processing circuit 224.

Frames are transferred to the egress framer 226, and output as POS OC-192 frames 228. The processor 230 may be coupled to the ingress processing circuit 214 and the egress processing circuit 224 to perform a variety of functions, including providing coprocessor support. Memories 232, 234 represent one or more memories associated with the ingress processing module 214 and the egress processing module 224 respectively.

The fabric interface system (FIS) 240 (herein represented by ingress fabric processor 220 and egress fabric processor 222) of the present invention interfaces the switch fabric 202 with the ingress 212 and egress 226 functions provided at a network node. In one embodiment, the FIS 240 is provided on a single chip. The FIS need not be implemented on a single chip, and the terms FIS and fabric processor may be used interchangeably.

Generally, the FIS 240 provides virtual input and output queuing with backpressure feedback, redundancy for high availability applications, and packet segmentation and reassembly into fixed or variable length cells. Variable length cells can reduce the ratio of header to data bytes, thus increasing bandwidth efficiency. Also, the total number of packets sent may be minimized, thereby minimizing the total processing incurred by per-packet operations. This can be particularly important in obtaining high throughput, since many network devices are limited not by how many bits per second they can process, but rather by the number of packets per second.

More particularly, the FIS 240 of the present invention includes multi-service fabric scheduling, including virtual output queuing to eliminate head of line blocking, and virtual input queuing for exhaustive congestion arbitration. The combination of virtual input and output queuing provide the most complete scheduling decisions possible. The scheduling module also accommodates multiple service classes, including "best effort" and "rate based" classes, provides weighted fair queuing support with programmable input and output schedulers, and provides support for strict frame ordering for unicast and multicast traffic.

Another feature of the FIS 240 is the actual fabric interface itself. In one embodiment, a CSIX fabric interface is provided, which provides backpressure support with CSIX flow control, and programmable CSIX frame segmentation and reassembly into fixed or variable length cells. The user configures fixed and variable-length cells. Fabric speed-up and load balancing is provided for high availability, and multicast support is provided for both spatial (fabric) and logical (egress) packet replication.

As described above, one embodiment of the present invention facilitates interfacing with the switch fabric via a CSIX, or Common Switch Interface. The present invention prepares the data for transport via the CSIX (or other) interface to the switch fabric, and further reconverts the data from the switch fabric for use by the egress processing system.

CSIX is a standard interface between a fabric interface (responsible for ingress and egress data queuing, among other things) and a switch fabric for data communication technologies such as ATM, IP, MPLS, Ethernet, and similar data communications applications. The CSIX standard defines the physical and message layers of this interconnect. CSIX provides an interface optimized for the needs of fabric and fabric interface communication, including unicast addressing for up to 4096 fabric ports, and multiple traffic classes that isolate data going to the same fabric port. Link level flow control is in-band and broken into a data and control queue to isolate traffic based on this granular type. Flow control between the fabric and fabric interface is defined and is relative to both fabric port and class. A CFrame is the base information unit transferred between fabric interfaces and a CSIX Fabric.

A CFrame includes a header, payload, and a vertical parity trailer. The CFrame Header contains the information fields needed to control the behavior of the fabric interface to CSIX Fabric interface. The Payload is variable in length and is passed by the CSIX Fabric from the ingress processing module to the egress processing module. The vertical parity trailer is used for error detection.

A CSIX interface is used and the switch fabric may be a CSIX fabric, which is an intelligent switch fabric that schedules, buffers, and switches data between its inputs and outputs. The fabric interfaces (e.g., ingress processing module) provides the CSIX fabric with information needed to perform scheduling and switching by means of a small CSIX header, which is prepended to the data payload. While the present invention is described in connection with a CSIX fabric interface for purposes of understanding, it will be readily apparent to those skilled in the art from the description provided herein that the present invention is also applicable to other interface implementations and standards.

One embodiment of the FIS 240 further includes control plane integration and software support through a host processing system. More particularly, CSIX control packet injection and reception is provided via the control plane interface. The host processing and accompanying software provides, among other things, performance monitoring and fabric statistics, software application programming interface (API) support, and a graphical user interface (GUI) programming interface.

Figure 3:
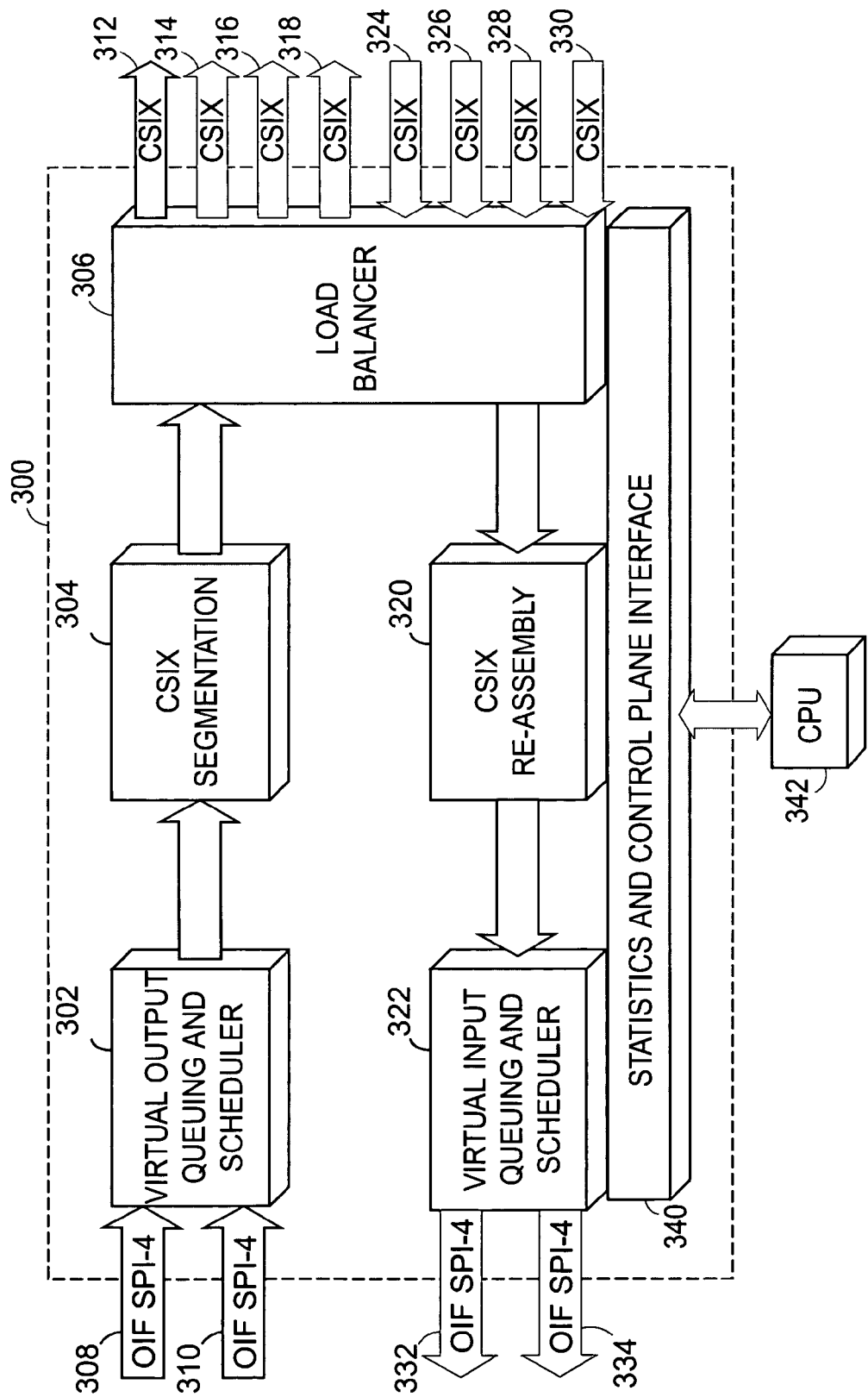
FIG. 3 illustrates a block diagram of one embodiment of a fabric interface system (FIS) in accordance with the principles of the present invention.

FIG. 3 illustrates a block diagram of one embodiment of a fabric interface system (FIS) 300 in accordance with the principles of the present invention. In this particular example, the FIS 300 is housed on a single chip. The ingress portion of the FIS 300 includes the virtual output queuing and scheduler 302, the CSIX segmentation module 304, and at least part of the load balancer module 306. The inputs and outputs of the ingress portion of the FIS 300 include multiple independent data path interfaces. In the illustrated embodiment, these multiple independent data path interfaces are represented by two Optical Internetworking Forum (OIF) System Packet Interface-4 (SPI-4) interfaces 308, 310. OIF SPI-4 describes a data path interface between the physical and link layers to support physical line data rates up to 10 Gb/s, and may be used in connection with the present invention, as may other interfaces. Each interface receives 64 bits of data in this example.

The virtual output queuing and scheduler module 302 performs a variety of functions, including effecting a rate change to adjust the data rate from the OIF interface to the core processing rate. The data is then processed to provide load balancing by determining which CSIX interfaces will transmit the data, based on the number of free buffers available for the required queue. The segmentor 304 chops the data into CSIX frames and appends the appropriate CSIX header. On the ingress side, the load balancer 306 queues the cells into buffer memory, and then dequeues the cells and provides them to the CSIX interface. Through the CSIX interface, the cells are output to the switch fabric (not shown), as depicted by CSIX data paths 312, 314, 316, and 318.

The egress portion of the FIS 300 includes a portion of the load balancer 306, the CSIX reassembly module 320 and the virtual input queuing and scheduling module 322. The load balancer 306 includes, in this example, four independent CSIX interfaces to receive data from the switch fabric shown on data paths 324, 326, 328, and 330. Generally, the CSIX interfaces perform CSIX conformance checking and discarding of any erroneous cells. The data is subjected to a rate changer to resynchronize the data rate from the CSIX interface to the core processing rate. The data is reassembled at the CSIX reassembly module 320. At the virtual input queuing and scheduler module 322, the data is queued, and once an entire packet is buffered, the virtual input queuing and scheduler module 322 will dequeue packets, and schedule the packets for ultimate transmission shown on OIF SPI-4 data paths 332, 334.

The statistics and control plane interface 340 provides an interface between the FIS 300 and a host processor, shown as a central processing unit (CPU) 342. In one embodiment, a 19-bit address bus and a 32-bit data bus couples the CPU and fabric processor. The duties of the CPU include writing and reading registers via the interface 340, where the registers are addressed by the address bus and the register contents read or written are provided on the data bus. In one embodiment of the invention, 32-bit registers are employed, which corresponds to the 32-bit data bus. Performance monitoring and fabric statistics can also be obtained via the statistics and control plane interface 340 and CPU 342.

Figure 4:
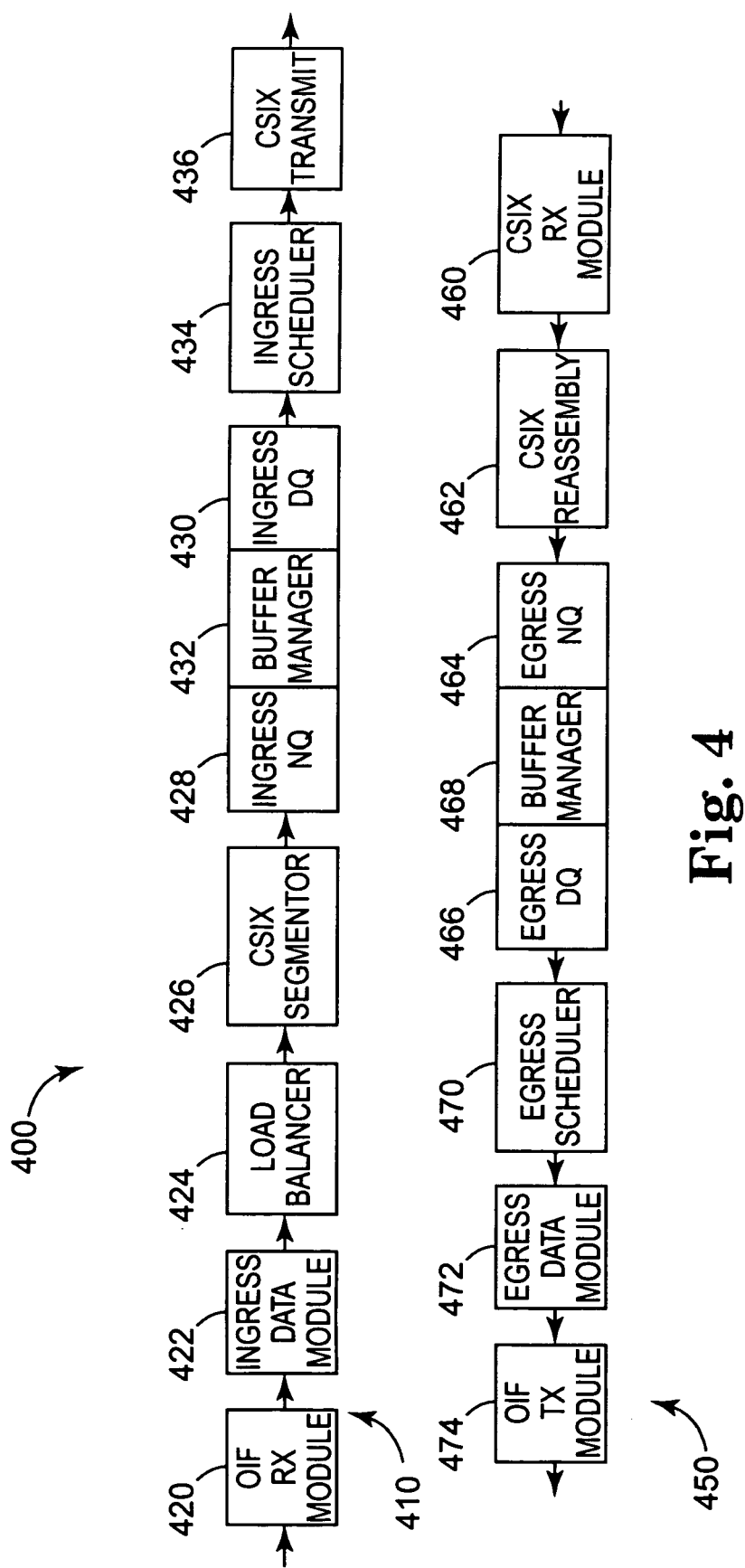
FIG. 4 is a block diagram of another embodiment of a fabric processor in accordance with the principles of the present invention.

FIG. 4 is a block diagram 400 of another embodiment of a fabric processor in accordance with the principles of the present invention. In FIG. 4, the ingress side 410 includes an Optical Internetworking Forum (OIF) receive module 420, an ingress data module 422, a load balancer 424, a CSIX segmentor 426, an ingress enqueue 428/dequeue 430 logic with associated buffer manager 432, an ingress scheduler 434 and a CSIX transmit module 436. On the egress side 450, a CSIX receive module 460, a CSIX reassembler 462, an egress enqueue 464/dequeue 466 logic with associated buffer manager 468, an egress scheduler 470, an egress data module 472, and a OIF transmit module 474 are provided.

The OIF receive module 420 will calculate parity and control flow based on the load balancer water marks, and will adjust the data rate from the OIF interface rate (e.g., 200 MHz) to the core processing rate (e.g., 250 MHz). The ingress data path module 422 provides an interface from the OIF Core/Rate Change FIFO to the load balancer 424.

The load balancer 424 enhances the quality of life for a network by automatically rerouting traffic to a healthy connection or server thereby providing a rudimentary form of error handling. The load balancer 424 monitors a state for the virtual input and output queues and directs traffic to an appropriate port on a switch element of the switch fabric. The load balancer 424 is a packet redirector to one of a plurality of ingress buffer management blocks. In a more particular embodiment, the load balancer 424 redirects packets to one of four ingress buffer management blocks to in turn provide four CSIX channels. The output of the load balancer 424 is fed into the CSIX segmentors 426 that provide CSIX frames to the enqueue engine 428. The segmentor 426 sends the appropriate status for each buffer used to enqueue the cell. The CSIX segmentor 426 can generate various frame types, depending on the format of the input packet data and the CSIX register settings. The CSIX segmented data is then transmitted to corresponding queue managers 432.

Enqueue/dequeue blocks 428, 430 take data from the load balancer and drive a CSIX channel. A queue scheduler 434 receives the data from the ingress dequeue.

On the egress side 450, a CSIX receive module 460 is provided, which also conforms to the CSIX Specification, Draft 3.4, which is incorporated herein by reference. The CSIX receive module 460 registers the data based on its source-synchronous clock. The CFrame data are checked for compliance and are sorted.

The data from the CSIX receive module 460 is reassembled at the CSIX reassembly module 462. Reassembled data is then transmitted to corresponding enqueue/dequeue manager 468 and then to the egress scheduler 470. An egress datapath module 472 provides an interface between egress dequeue channel 466 and the OIF Tx module 474. Each sub-port has a path from the egress datapath module 472 to the OIF Tx module 474.

The OIF Tx module 474 provides an interface from the egress datapath module 472. The OIF Tx module 474 can apply flow control for each sub-port. Likewise, the egress datapath module 472 can apply flow control to frames. The OIF Tx module 474 will interleave partial packets between multiple sup-ports.

Figure 5:
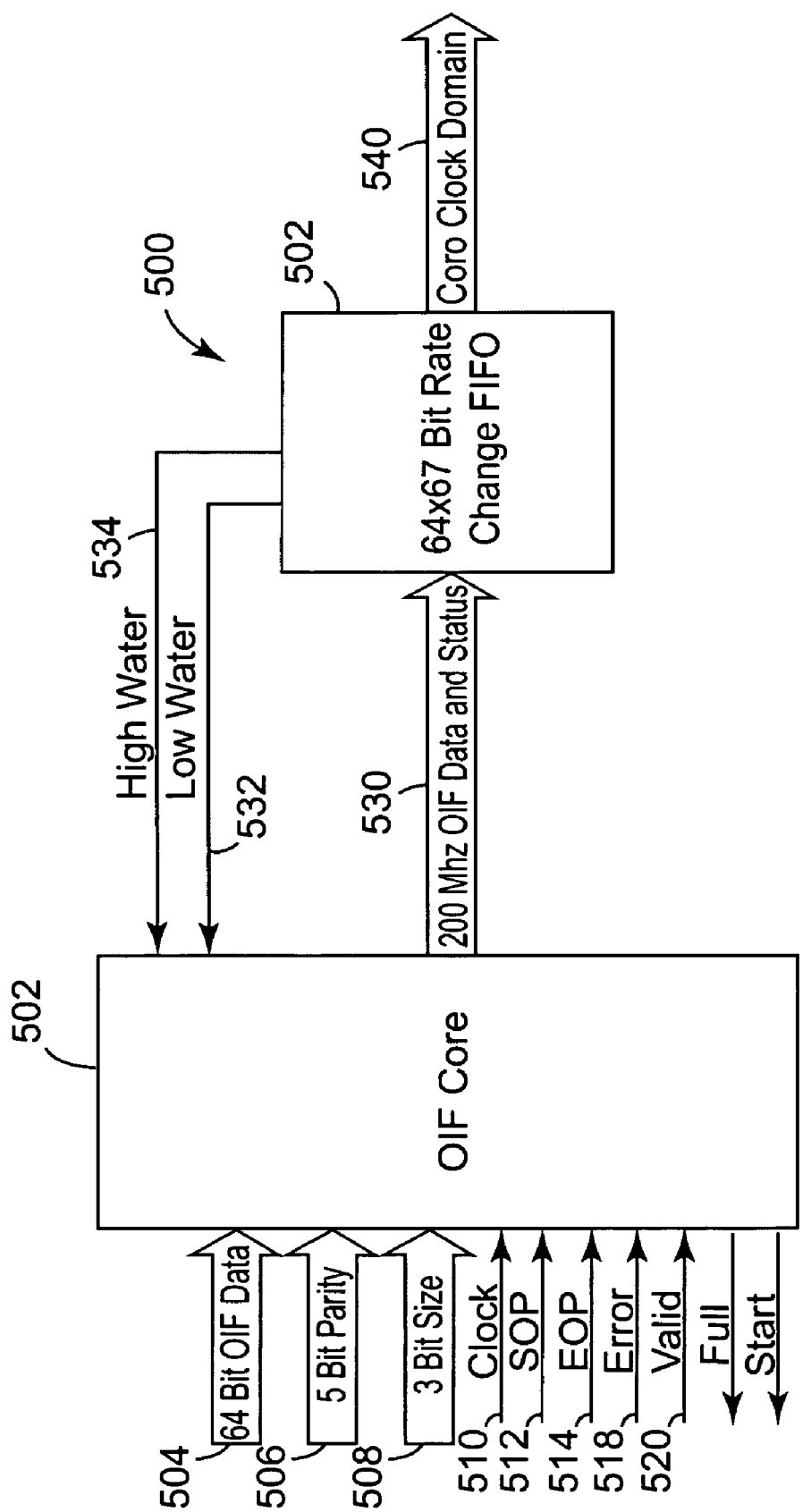
FIG. 5 illustrates a detailed embodiment of an OIF interface.

FIG. 5 illustrates a detailed embodiment of an OIF interface 500. OIF interfaces will calculate parity and control flow based on the load balancer watermarks, and will adjust the data rate from the OIF interface rate (e.g., 200 MHz) to the core processing rate (e.g., 250 MHz). The ingress OIF interface 500 operates as a single physical port. The OIF interface 500 includes an OIF core 502 and a rate change FIFO 502 to handle the clock domain crossing from the source synchronous OIF interface (e.g., 200 MHz) to the core clock frequency (e.g., 250 MHz). The OIF interface receives as input the OIF data shown by data path 504, parity indicators 506, and size indicators 508. The packet length may be any configured length.

The OIF interface also receives a variety of control signals including the clock 510, start of packet (SOP) 512, end of packet (EOP) 514, error 516, and valid 518 signals. The output of the OIF core 502 may include start of packet (SOP), end of packet (EOP), and TAIL information as status with the data shown on data path 530, wherein "TAIL" represents a field including the required error checking and valid byte information. The queue manager may use the error status information further down the ingress pipe to delete an entire packet(s) from the system if required.

The rate changer 502 includes rate change FIFOs in one embodiment, and programmable low 532 and high 534 "water marks" on the rate change FIFOs may be used to control the OIF source flow, including flow control on non-packet boundaries. The rate changer 502 receives the data on data path 530 at a first clock frequency used in the OIF clock domain, and outputs the data on data path 540 at a second clock frequency used in the fabric processor. The rate changer 502 is implemented as a rate change FIFO in one embodiment of the invention. The output of the OIF core 502 includes 67 bits into the rate change FIFO 502, where the rate change FIFO 502 buffers the packet up to eight 64-bit words before the extractor at the next stage is enabled.

Figure 6:
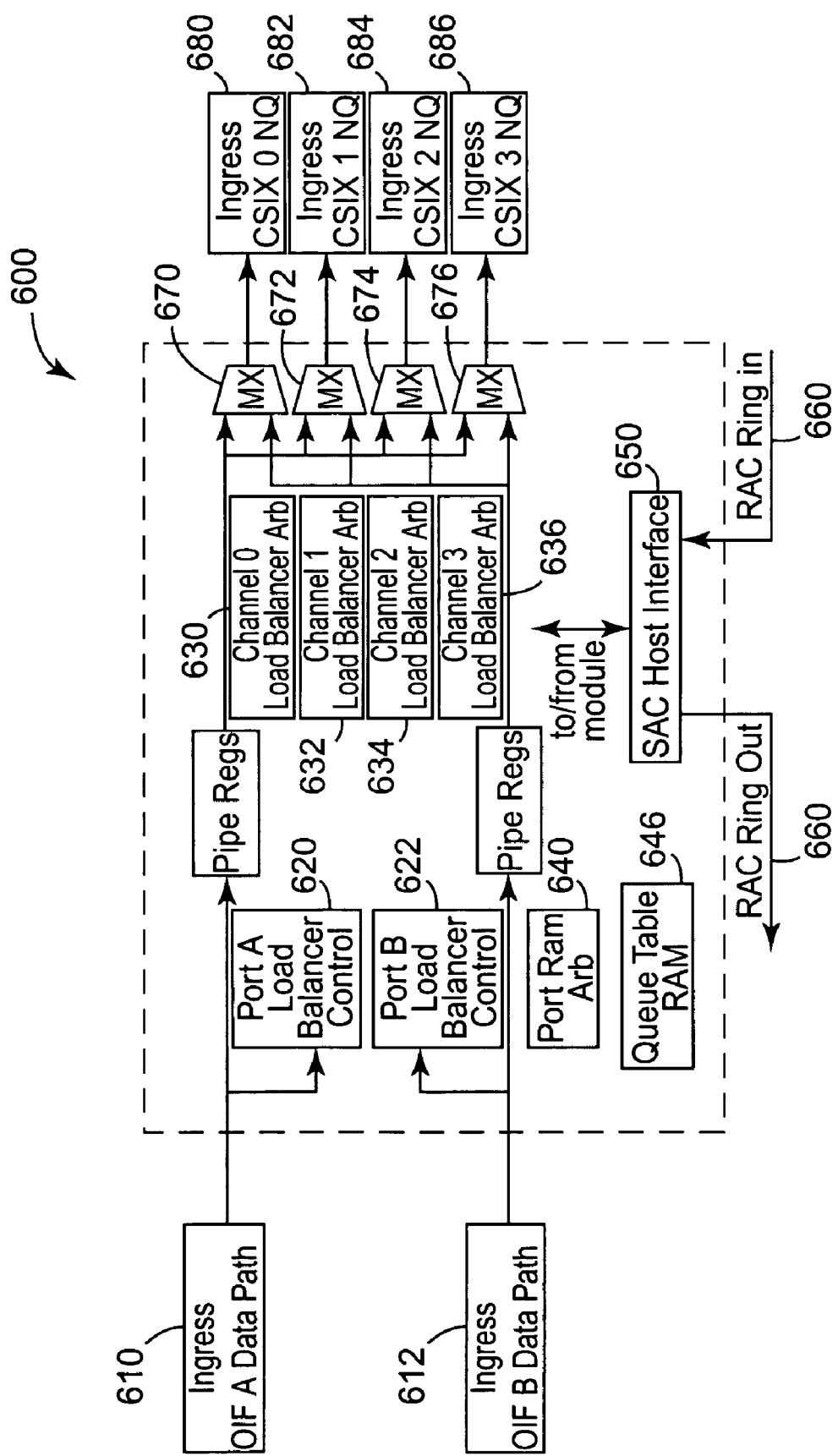
FIG. 6 illustrates a block diagram of one embodiment of a load balancer according to the present invention.

FIG. 6 illustrates a block diagram of one embodiment of a load balancer 600 according to the present invention. The function of the load balancer 600 is to direct packets that have arrived from an OIF port via an OIF ingress data path 610, 612 to one of four CSIX channels 680, 682, 684, 686 via that channel's Ingress Queuing block. The load from the OIF interfaces is intelligently distributed to the four CSIX channels 680, 682, 684, 686. In this manner, the ingress section is capable of maintaining line rate performance into the switch fabric. Furthermore, the distribution of packets over many CSIX channels improves throughput in the egress section, facilitating the delivery of packets to the egress OIF interface at line rate.

The load balancer 600 operates on a packet basis, selecting the least subscribed channel for the ingress queue associated with the packet. In certain situations, it is desirable to force the load balancer 600 to select a specific CSIX channel, rather than applying the standard load-balancing algorithm. The load balancer 600 contains identical port load balancer controllers 620, 622 for each ingress OIF data path block 610, 612. Each port load balancer controller 620, 622 chooses a desired CSIX channel 680, 682, 684, 686 to receive the current packet, and then generates a request to the channel load balancer arbitration 630, 632, 634, 636 associated with that channel. The channel load balancer arbitration 630, 632, 634, 636 will grant the channel to the port load balancer controller 620, 622 on a CFrame-by-CFrame basis. A queue table RAM contains an entry for each of the ingress queues; this entry indicates the last channel selected by port load balancer controllers 620, 622. Arbitration is provided to resolve simultaneous accesses, since the RAM is accessible by both port load balancer controllers 620, 622.

The load balancer 600 may include identical channel load balancer arbitration sub-blocks 630, 632, 634, 636 for each ingress queuing block. Each channel load balancer arbitration 630, 632, 634, 636 that is requested grants an OIF port on a CFrame-by-CFrame basis. At most, two of the four channel load balancer arbitration sub-blocks 630, 632, 634, 636 will be active at any one time, since there are only (at most) two requesting port load balancer controllers 620, 622. If both port load balancer controllers 620, 624 request the same channel load balancer arbitration 630, 632, 634, 636, the packets from the two ports will be interleaved on a CFrame-by-CFrame basis. The two packets belong to different ingress queues; thus, ensuring packet ordering is not a problem. The ingress queuing block maintains the context for both queues.

The data path is responsible for moving the CFrames from the ingress OIF data path blocks to the ingress queuing blocks. It delays the incoming data until a load balancing decision can be made, and steers the CFrames to the correct channel. A diagnostic bypass capability may be used to force fixed connections between the ingress OIF data path blocks and two of the ingress queuing blocks, without any header decoding and load balancing. SAC host interface 650 and configuration registers provide a standard interface to one of the RAC rings 660. Also included is the control and status registers for the load balancer 600, an interface to the queue table RAM 640, and interrupt logic for reporting errors.

Thus, the load balancer 600 intelligently selects a CSIX channel to receive each ingress packet and provides minimal performance degradation. The port load balancer controllers 620, 622 provides an interface with one ingress OIF data path to control the transfer of ingress packets to the associated data path pipeline registers, extracts pertinent header and control information from the incoming data, interfaces with the queue table RAM 646 (via the port RAM arbitration) to obtain (and later update) the most recently selected CSIX channel for each queue, interfaces with all ingress queuing blocks (via the port RAM arbitration) to obtain queue utilization information about each CSIX channel 680, 682, 684, 686, interfaces with all ingress queuing blocks to obtain delete engine status about each CSIX channel 680, 682, 684, 686, applies a load-balancing algorithm to determine which CSIX channel is most desirable, provides a mechanism to direct a packet to a specific CSIX channel 680, 682, 684, 686, thus overriding the choice of the load-balancing algorithm, interfaces with the channel load balancer arbitration sub-blocks 680, 682, 684, 686 to gain access to the desired ingress queuing blocks, interfaces with the SAC host interface 650 and configuration registers for parameter initialization and update.

The goal of the balancer 600 is to distribute packets within each queue equitably among the four CSIX channels 680, 682, 684, 686. The measurement parameter is the number of buffers used by the queue in each channel. The load balancer 600 attempts to select the channel with the fewest number of buffers being used by the queue. Other limitations may preclude the choice of this channel, in which case another channel is selected.

Figure 7:
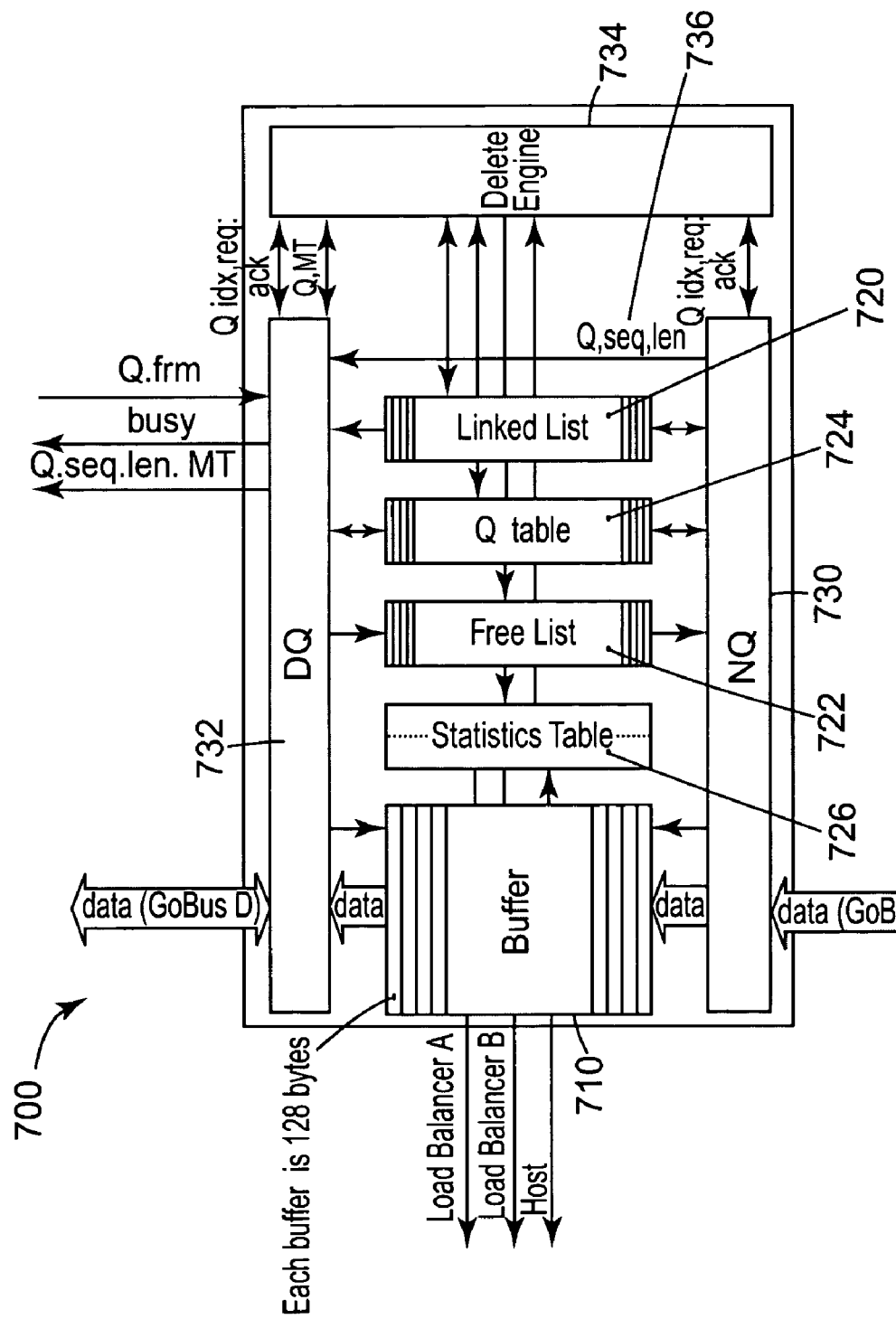
FIG. 7 illustrates a block diagram 700 of the enqueue and dequeue logic according to one embodiment of the present invention.

FIG. 7 illustrates a block diagram 700 of the enqueue and dequeue logic according to one embodiment of the present invention. The enqueue/dequeue block contains the buffer memory 710 where segmented packets are stored and scheduled to dequeue via the programmable parameters driving the scheduler. Each queue can have data present in each of the four enqueue/dequeue blocks, but packets will not be split between CSIX channels.

The input data is stored in a linked list 720 of buffers. Each queue has a unique linked list 720. The enqueue/dequeue block works on CSIX frames of data. The data comes in from the load balancer after it has been segmented into CSIX frames. The load balancer will work on one packet at a time from each of the two input OIF ports. Therefore, the enqueue block 730 has to handle at most two simultaneous packets from the load balancer. These two packets can be interleaved on a CSIX frame boundary at the enqueue input. The dequeue block 732 drives CSIX frames out to a CSIX channel. Each enqueue/dequeue block 730, 732 preferably drives one of the four CSIX channels. The scheduler picks which queues to pull data from. The data is driven out as whole CSIX frames. The scheduler works on transferring frames of data, not packets, so the CSIX channel may interleave many frames from different packets.

There are three main sub modules that contain control logic. One is the enqueue block (NQ) 730, which takes data from the load balancer and put it into the packet memory. It then updates the linked list for that queue. The other is the dequeue (DQ) block 732, which takes the data out of the packet memory and drives it out onto the CSIX port. This is done under the control of the scheduler, which picks which queue to take data from and when to take the data. The third is the delete engine 734, which removes packets from the buffer memory when the dequeue operations have not kept up with the enqueue operations. The delete engine will also remove packets that have errors. There are also RAM blocks contained within the enqueue/dequeue block. The RAM blocks include the buffer memory 710, the linked list memory 720, the free list memory 722, the queue table memory 724, and the statistics memory 726. The buffer memory 710 holds the data to be transferred. The buffers are dynamically allocated and freed by the enqueue 730 and dequeue 732 blocks. The linked list memory 720 keeps track of which buffers belong to which queue and the order to transfer the buffers. The free list memory 722 is a FIFO that holds pointers to the unallocated buffers. The queue table memory 724 holds the status of each queue. The statistics memory 726 keeps track of the number of buffers each queue is using and the programmed threshold for the buffer count. These per channel statistics are used by the load balancer and the delete engine.

Two types of multicast are supported, spatial multicast and logical multicast. The solution to the problem of efficient multicast traffic handling, is to use a hybrid approach that combines the memory approach for logical multicast and the switch approach for spatial multicast. Logical multicast is typically used for sub-port replication within a line card and spatial multicast for line card to line card replication within a routing or switching system. This hierarchical approach can be significantly enhanced by integrating the memory approach with the crossbar approach for the spatial application. Since the greatest problem is the arbitration for unpredictable multicast traffic patterns, by categorizing multicast into different classes within the system the highest levels of efficiency can be obtained. Using one multicast category for packet replication to one additional port and replicating the packet for all the ports are obviously different classes of problems therefore require separate solutions. The categories for multicast need to be defined and tuned to the system but an example is by the number of replications (1, 2, 4, 8, 16 . . . n) where n is the maximum for the system which is also called broadcast.

Assigning multicast to groups provides the necessary predictably to the arbitration logic for more efficient arbitration and greater throughput. The decision can be made to use the memory buffer replication for small groups and the large groups could be a combination of memory buffer and switching replication. Accordingly, the enqueue/dequeue logic 700 supports efficient multicast data transfer.

Another issue addressed by the enqueue/dequeue logic is error signal handling. Packets may come to the enqueue engine 730 with an error signal. The error signal comes at the end of a packet so the packet will have been written into buffer memory 710. Since the enqueue block 730 is the first place that the entire packet is buffered, this is the first block that can delete a packet with an error. When the enqueue engine sees a packet with an error, it will send that packet to the delete engine 734. The queue table 724 will not be updated to reflect the packet with the error. The delete engine 734 will not have to stitch the linked list, as the queue table 724 will point to the last valid packet. The next arriving packet will write over the next pointer that was pointing to the packet with an error. The packet will also be sent to the delete engine 734 if there is an abort from the load balancer. The delete engine 734 needs to return all of the buffers used for the error packet to the free list.

The scheduler gets information about the queues from both the enqueue engine 730 and the dequeue engine 732. When a packet is written into an empty queue, the enqueue engine 730 sends a message 736 through the dequeue engine 732 to the scheduler. This message 736 tells the scheduler the length of the packet at the top of the queue and that the queue has valid data. The dequeue engine 732 sends messages to the scheduler whenever it removes a packet from a queue. The dequeue engine 732 will tell the scheduler the size of the next packet in that queue. The size will be zero if there are no more valid packets for that queue. In this way, the scheduler will know the size of the packet at the top of each queue.

A data transfer is started when the scheduler requests a number of CSIX frames from a queue. The dequeue engine 732 will read the queue table 724 to find the start of the linked list 720. Then the dequeue engine 732 will start pulling data from the buffer memory 710. The linked list memory 720 does not have to be read as the queue table 724 has the pointer to the first buffer, which is also the start of the linked list 720.

As buffers are read, a message is sent to the free buffer list 722 to free the buffer. There is also a message sent to the channel statistics block 726. The linked list 720 must be read to find the next pointer. The delete engine 734 is used to free up buffers in the packet RAM when the chip is running out of room to accept new data. If the free buffer FIFO goes below a programmable almost empty threshold, then the delete engine 734 automatically starts to try and delete packets and return the buffers to the free list 722. There are two thresholds, one to start the delete engine 734 and the other to mark when to stop deleting. The gap between these thresholds provides hysteresis. There is one delete engine 734 per CSIX channel. The delete engine 734 tries to delete packets from queues that are violating their bandwidth allocation. There is one RAM per channel that keeps track of the programmed threshold and the difference between the current number of buffers used and the threshold for each queue. This is the channel statistics table 726. To determine the queue that should have packets deleted, the statistics table 726 could be scanned to see which queue was the worst violator of the threshold. However, the scan would take too long, so there is a separate list maintained of the eight worst violators in the statistics table 726. The delete engine 734 works from the list of violators. In parallel the list is maintained when buffers are enqueued or dequeued.

When the delete engine 734 is triggered it wants to start deleting packets. It will start at the top of the list of violators and scan down the statistics table 726 until it finds a packet to delete. A queue in the list may have exceeded its threshold of buffers and yet not have a complete packet in the buffer 710. This can easily happen with large packets where there are two packets partially in the buffer 710, one that has had a few buffers dequeued and another that is partially enqueued. Also, once the scheduler knows about a packet at the top of a queue, that packet cannot be deleted since the scheduler will request that packet. As long as the delete engine 734 is above the trigger threshold, it will continue to scan the list of violators from top to bottom looking for a queue with a packet to delete. After each packet is deleted the scan will start at the top of the list again. The list will be resorted on a continuous basis and the enqueue engine 730 may also swap queues on and off the list while the delete engine is working.

If the delete engine 734 can find no packets to delete in the list of violators, it will then rescan the list looking for partially enqueued packets and delete these packets. After a partially enqueued packet is deleted, the enqueue engine 730 will discard any new frames for that packet until it sees the end of the packet. Since the violators' list is the only thing used to pick queues to delete from, it is possible for a queue that is not on the list to have a full packet and yet the delete engine 734 will start deleting partial packets from the queues on the violators list.

The egress enqueue 730 and dequeue 732 logic works much the same as the ingress logic. One main difference is that the slower CSIX interface is on the enqueue side 730 rather than the dequeue side 732.

The egress delete engine 734 is the same as the ingress delete engine except that it has to deal with multi enqueued packets. The problem for the delete engine 734 with multi enqueue packets is that they share buffers amongst many queues. When the delete engine 734 tries to delete a multi enqueue packet it must check the count field. If the count is one, then there is only one queue using the buffers and the packet can be deleted. If the count is greater than one, then the delete engine 734 will traverse the list decrementing the count value for each buffer in the list. This does not free any buffers so the delete engine will take extra time before it can do any useful work.

Figure 8:
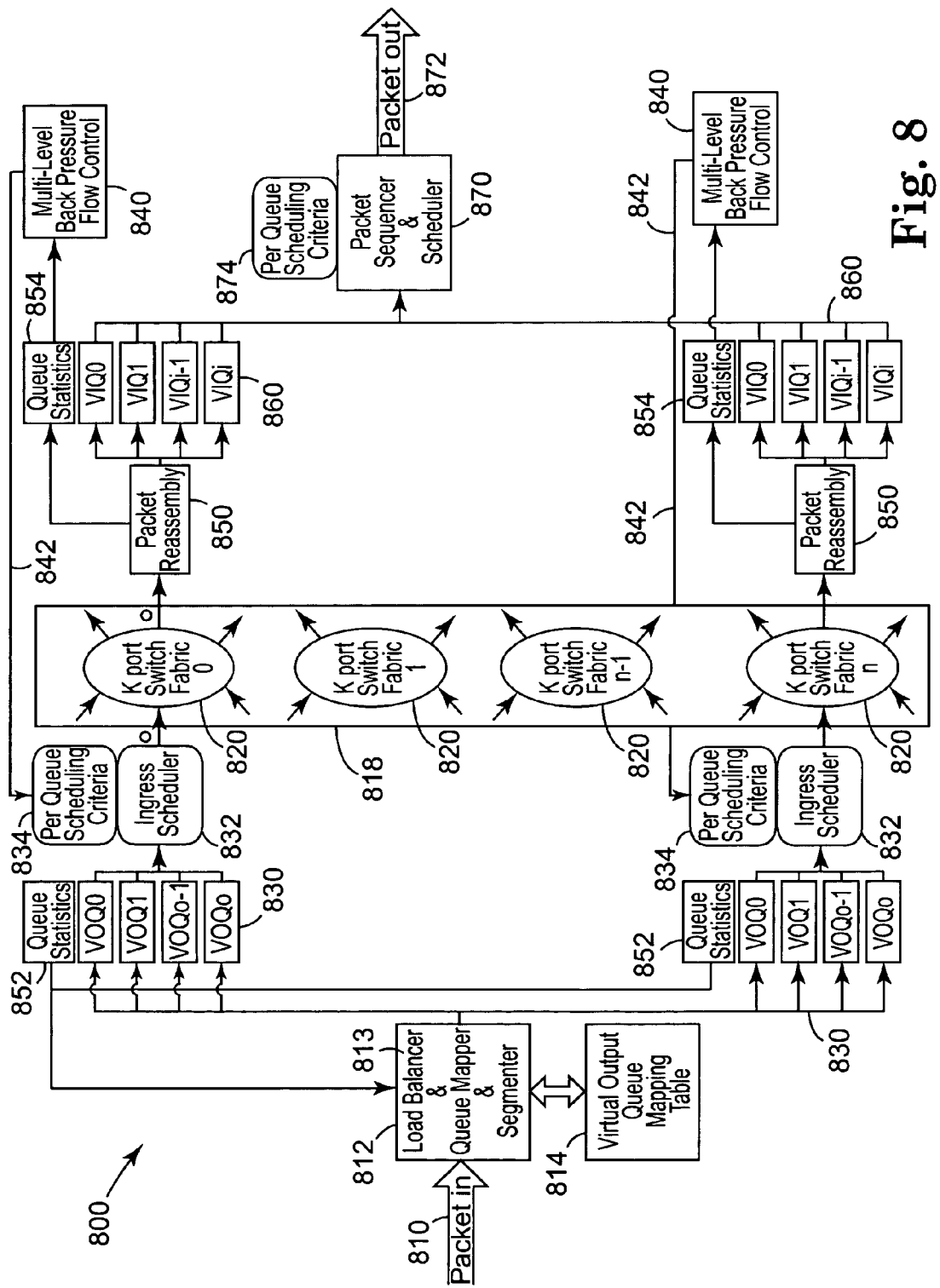
FIG. 8 is a block diagram illustrating the multi-service queuing apparatus according to the present invention that provides exhaustive arbitration, load balancing, and support for rapid port failover.

FIG. 8 is a block diagram 800 illustrating the multi-service queuing apparatus according to the present invention that provides exhaustive arbitration, load balancing, and support for rapid port failover. In FIG. 8, virtual input and output queues for storing packets are coupled to a switch fabric 818. A packet 810 is received by the load balancer/queue mapper/segmenter 812. The frame is mapped using a programmable mapping table 814. The programmable mapping table 814 is programmed to map each of the virtual input 860 and output 830 queues according to traffic characteristics governing packet flows. The load balancer 813 monitors a state for the virtual output queues 830 and directs traffic to an appropriate port on a switch element 820 of the switch fabric 818. The mapping table 814 provides rapid failover through reassignment of packets to the virtual input and output queues. The mapping table 814 also maps different queues for different service classes and enables rapid failover for a queue that fails to meet a selected failover criteria.

For each k port switch element 820, a set of virtual output queues 830 are provided. The virtual output queues 830 feed an ingress scheduler 832. The ingress scheduler 832 is controlled by the multi-level backpressure flow controller 840. The multi-level backpressure flow controller 840 provides congestion control for the virtual input 860 and output 830 queues and the switch fabric 818. The backpressure flow controller 840 controls the packet queuing for the virtual output queues 830 by applying a multilevel backpressure indication 842 that is fed back to the per queue scheduling criteria 834 at the virtual output queues 830 to balance loads based upon the collected statistics. The multilevel backpressure indication 842 may be selected to reduce an instantaneous rate for a virtual output queue 830 associated with the packet causing congestion or to reduce an average transmission rate of a virtual output queue 830 associated with the packet causing congestion. The backpressure indicator is used while dynamically allocating buffers of the virtual output queues 830 to ensure fairness under congestion control. The virtual output queues 830 are controlled using per queue thresholds. The ingress scheduler 832 passes frames to switch fabric element 820 according to the per queue scheduling criteria 834.

At the egress of the switch fabric element 820, frames are received by a packet reassembler 850. Queue statistics 852, 854 are maintained at the egress side and the ingress side. The statistics interfaces 852, 854 collect statistics regarding the virtual input and output queues. The statistics interfaces 852, 854 maintain a state for all virtual input and output queues and in particular maintains a state for queues having the worst load violations. The reassembled data is fed to virtual input queues 860. Each virtual input queue 860 may be mapped independently of the input for complete virtualization. The virtual input queues 860 provide packets to the packet sequencer and scheduler 870 where the packets are provided to the packet output 872 according to the scheduling method. Per queue scheduling criteria 874 is provided to the scheduler.

As described above, multi-level backpressure 840 is provided to adjust the flow control. The backpressure signals 842 are provided to the per queue scheduling criteria 834 at the ingress scheduler 832. The ingress scheduler 832 may then apply backpressure to a particular queue source to relieve congestion at the virtual input queues 860 on the egress side. Accordingly, the packet may be remapped or dropped on the ingress side. Dropping the packet on the ingress side provides a savings in switch fabric capacity.

At least two levels of backpressure signals 842 may be applied. A first backpressure signal provides instantaneous control to address congestion detected in the switch. A second backpressure signal reduces an average transmission rate of the virtual queues 830, 860. The virtual queue mapping table 814 maps incoming packets to both the virtual input 860 and output 830 queues. The virtual queue mapping table 814 thus provides the mechanism for rapid port failover and mapping of different queues for different service classes. There are i virtual input queues where i is equal to the product of the number of switch ports, the number of virtual output queues for each switch port and the number of subqueues per queue.

The fabric interface system (FIS) 800 also provides redundancy for high availability applications, and packet segmentation and reassembly into variable length cells. The user configures fixed and variable-length cells. More particularly, the FIS 800 of the present invention includes multi-service fabric scheduling, including virtual output queuing 830 to eliminate head of line blocking, and virtual input queuing 860 for exhaustive congestion arbitration. The scheduling module 870 also accommodates multiple service classes, including "best effort" and "rate based" classes, provides weighted fair queuing support with programmable input and output schedulers, and provides support for strict frame ordering for unicast and multicast traffic. The virtual input 860 and output 830 queues and switch fabric support multi-service classes, variable length packets, variable quality of service requirements, and a plurality of rate classes. Multicasting may be performed using a combination of multiple enqueueing on the virtual output queue 830 and using fabric replication, as described above, for example, including both spatial (fabric) and logical (egress) packet replication. The power is derived by creating different multicast groups that can maintain the highest level of fabric efficiency. The logical multicast for subports is handled by the virtual input queues 860.

The load balancer 812 monitors the state of all virtual queues and directs the traffic to the appropriate fabric effectively balancing the load across all fabrics. This function may also be over-ridden for manual balancing applications. Accordingly, the FIS of the present invention assures fairness with variable sized packets of different service classes and provides redundancy and failover mechanisms.

Figure 9:
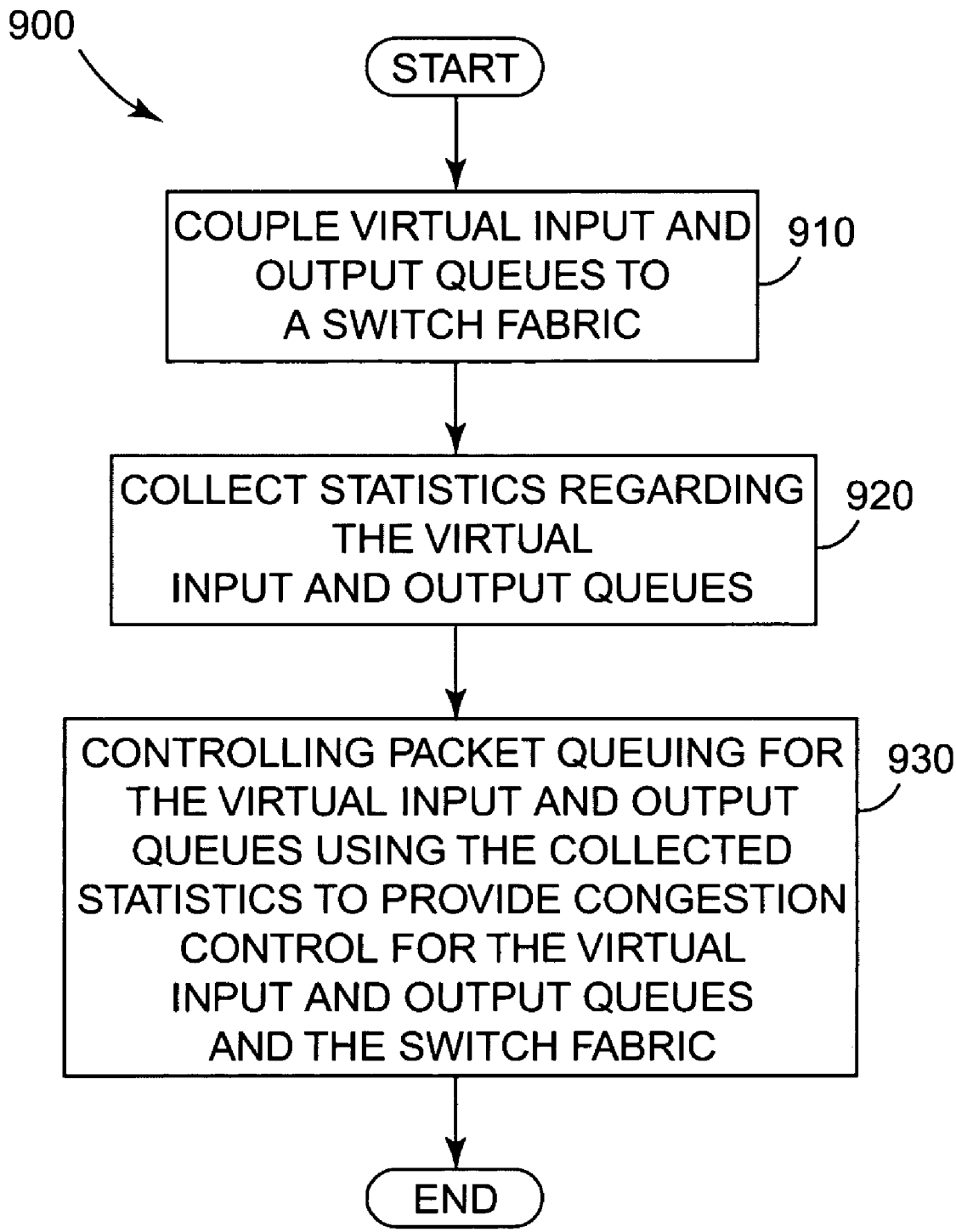
FIG. 9 illustrates a flow chart of the multi-service queuing method according to the present invention to provide exhaustive arbitration, load balancing, and support for rapid port failover.

FIG. 9 illustrates a flow chart 900 of the multi-service queuing method according to the present invention to provide exhaustive arbitration, load balancing, and support for rapid port failover. Virtual input and output queues are coupled to a switch fabric 910. Statistics regarding the virtual input and output queues are collected 920. Packet queuing for the virtual input and output queues is controlled using the collected statistic to provide congestion control for the virtual input and output queues and the switch fabric 930. A multilevel backpressure indication is fed back to the virtual input and output queues to prevent violation of a threshold condition caused by storage of a new packet by the virtual input queues. The virtual output queuing provides load balancing when collected statistics indicate congestion occurs. Controlling packet queuing for the virtual input and output queues provides rapid failover through reassignment of packets to the virtual input and output queues.

Figure 10:
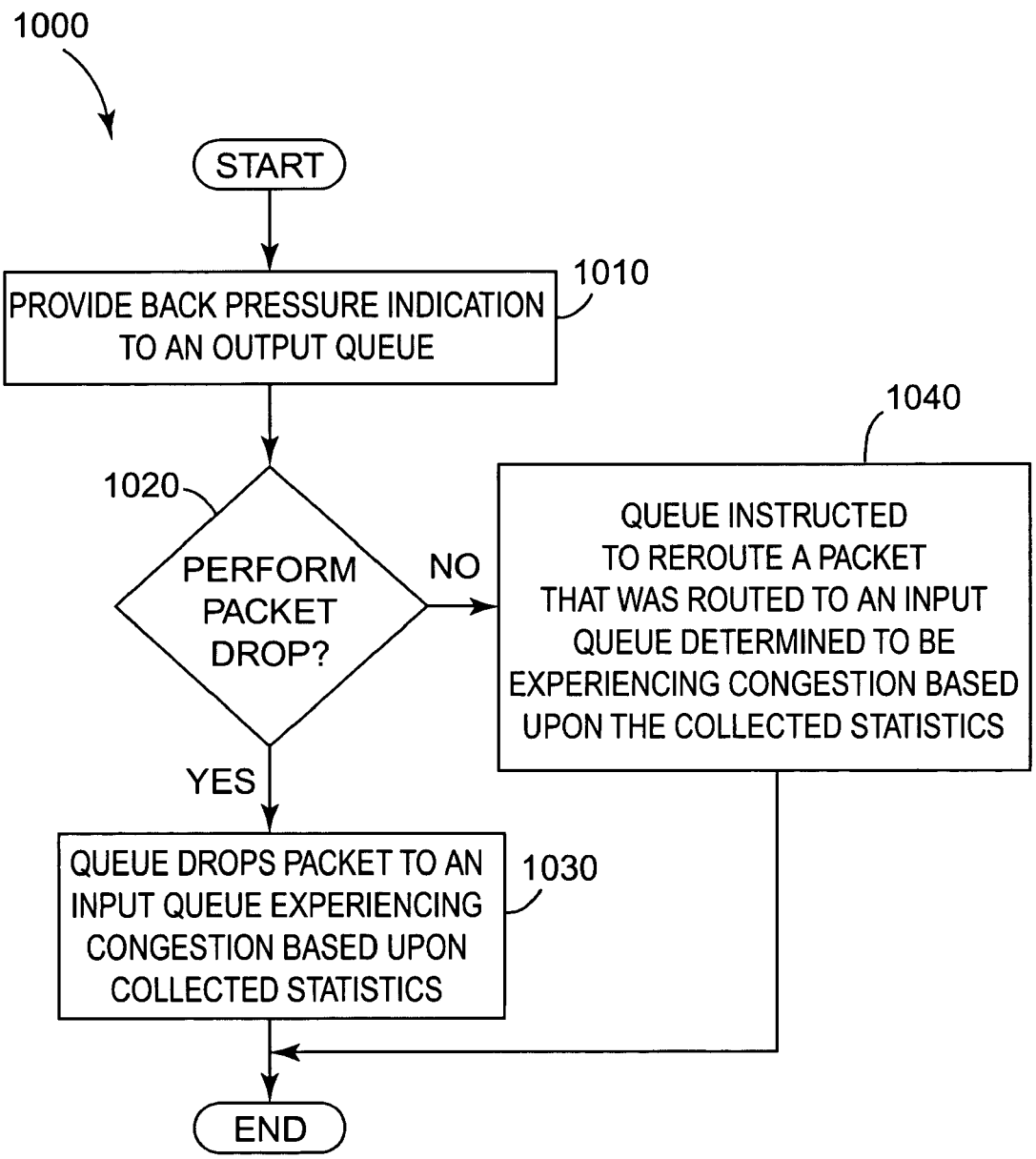
FIG. 10 illustrates a flow chart of congestion control provided by control of the packet queuing for the virtual input and output queues according to the present invention.

FIG. 10 illustrates a flow chart 1000 of the method for controlling packet queuing for the virtual input and output queues according to the present invention. Backpressure indication is provided to a virtual output queue 1010. The virtual output queue is instructed by backpressure indication to perform a congestion control action 1020. The virtual output queue may be directed to drop a packet routed to a virtual input queue experiencing congestion based upon collected statistics 1030. The dropping of the packet at the virtual output queue saves resources in the switch fabric. The virtual output queue may also be instructed to reroute a packet routed to a virtual input queue experiencing congestion based upon the collected statistics 1040.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A switching method, comprising:
   providing virtual input and output queues coupled to a switch fabric comprising switch elements;
   collecting statistics regarding the virtual input and output queues;
   and controlling packet queuing for the virtual input and output queues by:
      using the collected statistic to provide congestion control for the virtual input and output queues and the switch fabric, and
      applying a multilevel backpressure indication that is fed back to the virtual output queue to prevent violation of a threshold condition caused by storage of a new packet by the virtual input queues.

2. The method of claim 1 wherein the multilevel backpressure indication may be selected to reduce an instantaneous rate for a virtual output queue associated with the packet causing congestion or to reduce an average transmission rate of a virtual output queue associated with the packet causing congestion.

3. The method of claim 1 wherein the applying multilevel backpressure further comprises dynamically allocating buffers in the virtual output queues to ensure fairness under congestion control.

4. The method of claim 3 wherein the buffers are dynamically allocated using per queue thresholds.

5. A switching method, comprising:
   providing virtual input and output queues coupled to a switch fabric comprising switch elements;
   collecting statistics regarding the virtual input and output queues;
   and controlling packet queuing for the virtual input and output queues by:
      using the collected statistic to provide congestion control for the virtual input and output queues and the switch fabric, and
      providing efficient multicast data transfer by combining multiple enqueueing via the virtual output queues and fabric replication.

6. A switching method, comprising:
   providing virtual input and output queues coupled to a switch fabric comprising switch elements;
   collecting statistics regarding the virtual input and output queues; and controlling packet queuing for the virtual input and output queues by:
      using the collected statistic to provide congestion control for the virtual input and output queues and the switch fabric, and
      reassiging packets to the virtual input and output queues to provide rapid failover.

7. The method of claim 6 wherein the controlling packet queuing for the virtual input and output queues further comprises instructing a virtual output queue to drop a packet routed to a virtual input queue experiencing congestion based upon the collected statistics.

8. The method of claim 7 wherein the dropping of the packet at the virtual output queue reduces a number of resources used in the switch fabric.

9. The method of claim 6 wherein the controlling packet queuing further comprises instructing a virtual output queue to reroute a packet routed to a virtual input queue experiencing congestion based upon the collected statistics.

10. A switching method, comprising:
providing virtual input and output queues coupled to a switch fabric comprising switch elements;
collecting statistics regarding the virtual input and output queues; and controlling packet queuing for the virtual input and output queues by:
using the collected statistic to provide congestion control for the virtual input and output queues and the switch fabric, and
mapping packets to the virtual input and output queues to allow rapid failover for a queue that fails to meet a selected failover criteria.

11. A switch, comprising:
virtual input and output queues for storing packets;
a switch fabric, coupled to the virtual input and output queues, the switch fabric including switch elements for receiving packets from a virtual output queue and routing the packet to a virtual input queue;
a statistics interface for collecting statistics regarding the virtual input and output queues; and a fabric interface controlling packet queuing for the virtual input and output queues by applying a multilevel backpressure indication that is fed back to the virtual output queue to balance loads based upon the collected statistics, the fabric interface providing congestion control for the virtual input and output queues and the switch fabric.

12. The switch of claim 11 wherein the multilevel backpressure indication may be selected to reduce an instantaneous rate for a virtual output queue associated with the packet causing congestion or to reduce an average transmission rate of a virtual output queue associated with the packet causing congestion.

13. The switch of claim 11 wherein the fabric interface applies multilevel backpressure by dynamically allocating buffers in the virtual output queues to ensure fairness under congestion control.

14. The switch of claim 13 wherein the buffers are dynamically allocated using per queue thresholds.

15. A switch, comprising:
virtual input and output queues for storing packets;
a switch fabric, coupled to the virtual input and output queues, the switch fabric including switch elements for receiving packets from a virtual output queue and routing the packet to a virtual input queue; a statistics interface for collecting statistics regarding the virtual input and output queues; and
a fabric interface controlling packet queuing for the virtual input and output queues, the fabric interface providing congestion control for the virtual input and output queues and the switch fabric and wherein the fabric interface provides efficient multicast data transfer by using multiple enqueueing via the virtual output queues and fabric replication.

16. A switch, comprising:
virtual input and output queues for storing packets;
a switch fabric, coupled to the virtual input and output queues, the switch fabric including switch elements for receiving packets from a virtual output queue and routing the packet to a virtual input queue; a statistics interface for collecting statistics regarding the virtual input and output queues;
a fabric interface controlling packet queuing for the virtual input and output queues, the fabric interface providing congestion control for the virtual input and output queues and the switch fabric; and
a programmable mapping table, the mapping table programmed to map each of the virtual input and output queues according to traffic characteristics governing packet flows the mapping table providing rapid failover through reassignment of packets to the virtual input and output queues.

17. The switch of claim 16 wherein the mapping table maps different queues for different service classes.

18. The switch of claim 16 wherein the mapping table enables rapid failover for a queue that fails to meet a selected failover criteria.

19. The switch of claim 16 wherein the fabric interface comprises a backpressure flow controller, the backpressure flow controller providing a multilevel backpressure indicator for instructing a virtual output queue to drop a packet routed to a virtual input queue experiencing congestion based upon the collected statistics.

20. The switch of claim 19 wherein the dropping of the packet at the virtual output queue reduces a number of resources used in the switch fabric.

21. The switch of claim 16 wherein the fabric interface comprises a backpressure flow controller, the backpressure flow controller providing a multilevel backpressure indicator for instructing a virtual output queue to reroute a packet routed to a virtual input queue experiencing congestion based upon the collected statistics.

* * * * *